US012775656B2

(12) United States Patent
Gracia-Tinedo

(10) Patent No.: US 12,775,656 B2
(45) Date of Patent: Oct. 27, 2026

(54) EMBEDDINGS-BASED INDEX FOR CONTENT SIMILARITY OPERATIONS IN OBJECT STORES

(71) Applicant: Dell Products L.P., Round Rock, TX (US)

(72) Inventor: Raúl Gracia-Tinedo, Barcelona (ES)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/908,328

(22) Filed: Oct. 7, 2024

(65) Prior Publication Data

US 2026/0099537 A1 Apr. 9, 2026

(51) Int. Cl.

| | |
|---|---|
| ***G06F 16/30*** | (2019.01) |
| ***G06F 16/31*** | (2019.01) |
| ***G06F 16/334*** | (2025.01) |
| ***G06F 16/383*** | (2019.01) |
| ***H04L 67/5682*** | (2022.01) |

(52) U.S. Cl.

CPC .......... *G06F 16/383* (2019.01); *G06F 16/316* (2019.01); *G06F 16/3347* (2019.01); *H04L 67/5682* (2022.05)

(58) Field of Classification Search

CPC .. G06F 16/383; G06F 16/316; G06F 16/3347; H04L 67/5682

See application file for complete search history.

(56) References Cited

U.S. PATENT DOCUMENTS 12,399,918 B1 * 8/2025 Zhao ........................ G06F 40/30
2016/0179972 A1 * 6/2016 Blackwell ............. G06F 16/248 707/722
2018/0165299 A1 * 6/2018 Danilov .............. G06F 16/1794
2019/0296917 A1 * 9/2019 Roth ...................... H04L 9/3247
2020/0142992 A1 * 5/2020 Ocher ...................... G06F 16/27
2020/0250239 A1 * 8/2020 Huang ..................... G06F 16/93
2022/0138170 A1 * 5/2022 Misiewicz ............... G06N 3/09 707/737
2022/0263927 A1 * 8/2022 Jin ........................ H04L 69/169
2025/0021253 A1 * 1/2025 Bert ......................... G06F 3/064
2025/0053553 A1 * 2/2025 Kondiles ............. G06F 16/2343
2025/0094777 A1 * 3/2025 Yakovlev ............. G06N 3/0455

OTHER PUBLICATIONS

Pinecone, https://www.pinecone.io/ (Mar. 2024).
Choma DB, https://www.trychroma.com/ (Mar. 2024).
Zilliz, https://zilliz.com/ (Mar. 2024).
PGVector, https://github.com/pgvector/pgvector (Mar. 2024).
(Continued)

*Primary Examiner* — Mahesh H Dwivedi
(74) *Attorney, Agent, or Firm* — Workman Nydegger

(57) ABSTRACT

Generating embeddings offline for content similarity functionality is disclosed. Objects stored in a storage system are processed offline to generate embeddings. The embeddings are stored in an embeddings index. The process of generating the embeddings is guided by policies. Content similarity searches may be performed inline by generating embeddings for an input object and then searching the embeddings index based on the input embeddings for the input object. The embeddings index allows additional functionality to be implemented based on the content-similarity search.

17 Claims, 6 Drawing Sheets

(56) References Cited

OTHER PUBLICATIONS

MongoDB Index Vector Embeddings, https://www.mongodb.com/docs/atlas/atlas-search/field-types/knn-vector/ (Mar. 2024).
Daras, Petros, Theodoros Semertzidis, Lambros Makris, and Michael G. Strintzis. "Similarity content search in content centric networks." In Proceedings of the 18th ACM international conference on Multimedia, pp. 775-778. 2010.
Sahin, Ozgur D., Fatih Emekçi, Divyakant Agrawal, and Amr El Abbadi. "Content-based similarity search over peer-to-peer systems." In International Workshop on Databases, Information Systems, and Peer-to-Peer Computing, pp. 61-78. Berlin, Heidelberg: Springer Berlin Heidelberg, 2004.
Shinde, Rajendra, Ashish Goel, Pankaj Gupta, and Debojyoti Dutta. "Similarity search and locality sensitive hashing using ternary content addressable memories." In Proceedings of the 2010 ACM SIGMOD International Conference on Management of data, pp. 375-386. 2010.
Gracia-Tinedo, Raúl, Josep Sampé, Edgar Zamora, Marc Sánchez-Artigas, Pedro Garcia-López, Yosef Moatti, and Eran Rom. "Crystal: {Software-Defined} Storage for {Multi-Tenant} Object Stores." In 15th USENIX Conference on File and storage Technologies (FAST 17), pp. 243-256. 2017.
Ofer, Effi, Amir Epstein, Dafna Sadeh, and Danny Harnik. "Applying deep learning to object store caching." In Proceedings of the 11th ACM International Systems and Storage Conference, pp. 126-126. 2018.
Noor, Jannatun, Rizwanul Haque Ratul, Mir Rownak Ali Uday, Joyanta Jyoti Mondal, Md Sadiqul Islam Sakif, and A. B. M. Islam. "Sherlock in Oss: A Novel Approach of Content-Based Searching in Object Storage System." arXiv preprint arXiv:2303.02105 (2023).
Gracia-Tinedo, Raúl, Flavio Junqueira, Tom Kaitchuck, and Sachin Joshi. "Pravega: A Tiered Storage System for Data Streams." In Proceedings of the 24th International Middleware Conference, pp. 165-177. 2023.
IBM Swift Storlets, https://www.ibm.com/opensource/open/projects/swift-storlets/.
Moatti, Yosef, Eran Rom, Raul Gracia-Tinedo, Dalit Naor, Doron Chen, Josep Sampe, Marc Sanchez-Artigas et al. "Too big to eat: Boosting analytics data ingestion from object stores with scoop." In 2017 IEEE 33rd International Conference on Data Engineering (ICDE), pp. 309-320. IEEE, 2017.
Gracia-Tinedo, Raúl, Marc Sanchez-Artigas, Pedro Garcia-Lopez, Yosef Moatti, and Filip Gluszak. "Lamda-flow: Automatic push-down of dataflow operators close to the data." In 2019 19th IEEE/ACM International Symposium on Cluster, Cloud and Grid Computing (CCGRID), pp. 112-121. IEEE, 2019.
Sampé, Josep, Marc Sánchez-Artigas, Pedro Garcia-López, and Gerard Paris. "Data-driven serverless functions for object storage." In Proceedings of the 18th ACM/IFIP/USENIX middleware conference, pp. 121-133. 2017.

* cited by examiner

EMBEDDINGS-BASED INDEX FOR CONTENT SIMILARITY OPERATIONS IN OBJECT STORES

TECHNOLOGICAL FIELD OF THE DISCLOSURE

Embodiments disclosed herein generally relate to indexing data stored in storage systems. More particularly, at least some embodiments relate to systems, hardware, software, computer-readable media, and methods for indexing objects, including unstructured objects, stored in object storage systems and to performing content similarity related operations.

BACKGROUND

In today's world, content is being generated an ever-increasing rate. There is, as a result, a corresponding need to store that data. While it is often easy to store data in a storage system, managing the data is a more difficult proposition, particularly when the data is unstructured. For example, a user that takes a lot of photographs may end up with a storage full of thousands of image data. One difficulty facing the use of the images is retrieving images that are similar to each other. It is one thing to search the metadata of the images (e.g., by date, time, location), but it is another matter to search for images that include similar content.

Object storage systems and object storage services can provide a universal storage substrate for data including unstructured data such as audio, video, and images. Object storage system provide a scalable design that allows the throughput and capacity of the object storage system to expand by adding resources as needed. Moreover, object storage systems often provide simple key/value semantics (e.g., via REST interfaces) which are amenable for integration with many applications.

The combination of object storage systems with artificial intelligence/machine learning mechanisms may lead to added value in the form of built-in capabilities that can be exposed via interfaces such as application programming interfaces (APIs).

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which.

DETAILED DESCRIPTION OF SOME EXAMPLE EMBODIMENTS

Figure 1:
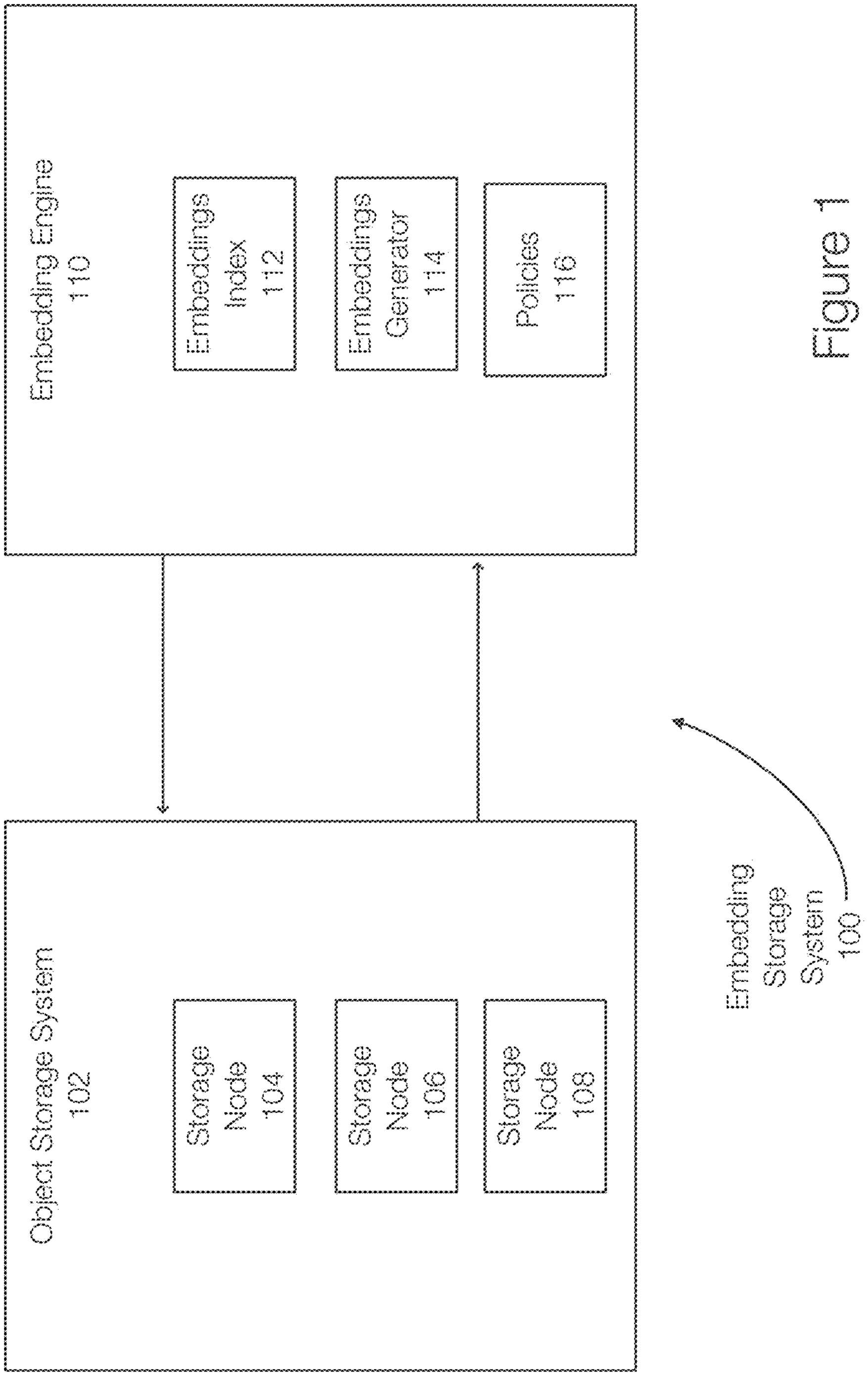
FIG. 1 discloses aspects of an embedding storage system that includes an object storage system and an embedding engine configured to perform operations related to object embeddings.

Embodiments disclosed herein generally relate to policy-driven embeddings-based indexes for content similarity and content similarity related operations in storage systems. More particularly, at least some embodiments relate to systems, hardware, software, computer-readable media, and methods for generating embeddings offline, content similarity application programming interfaces (APIs), and content similarity related operations in storage systems.

Embodiments of the invention are discussed in the context of storage systems that are configured to store objects (object storage systems or object stores). Examples of object storage systems include DELL ECS and Object Scale. Embodiments of the invention are also discussed in the context of objects by way of example only. Objects may include at least unstructured and/or structured data.

Object storage systems and object storage services, by way of example, may manage data as units referred to as objects rather than blocks or files. Each object typically includes data, metadata, and a unique identifier. Object storage systems allow vast amounts of unstructured data to be stored, accessed, and managed efficiently. Object storage systems is useful for a variety of different use cases, including storing multimedia files, backups, archives, and cloud-based applications.

Generally, an object storage system is configured to ingest and store objects (e.g., images, documents, videos). Embodiments of the invention augment this functionality with a semantic index (an embeddings index) using embeddings models. In an offline manner, once an object is stored in the object storage system, an event is written to an embeddings or write queue to keep track of the tasks related to generating embeddings for objects written to the object storage system. Thus, the object storage system is provided with an embeddings engine configured to perform operations related to generating and/or using embeddings. The embeddings engine reads objects from the object storage system, generates embeddings for the object and stores the embeddings in an embeddings database, which may be a vector database. With an embeddings index, which is an example of a semantic index, content-based similarity searches may be performed on user queries using content-similarity based functionality (e.g., application programming interfaces APIs).

Embodiments of the invention further relate to content-based similarity operations. These operations may be made available by providing APIs in or to object storage systems. In one example, an object storage system may include one or more data nodes that are configured to handle storage and metadata requests. In another example, an object storage system may be a multi-tier system that includes proxy nodes configured to handle user requests and metadata/data nodes configured to handle IO (Input/Output) for objects. Clients may interact with object storage systems with content-based API calls, such as REST API calls.

Embodiments of the invention relate to generating indexes to content of objects stored in an object storage system. The indexes may be generated in an offline manner and are based on or guided by policies. Indexes generated in this manner may also be exposed to API calls that may benefit various operations including content-based similarity searching.

In one example, policies are generated that allow an embeddings-based index to be generated for data objects in a flexible manner. Thus, the embeddings-based index becomes an index to the content of the objects rather than the objects themselves. The policies are configured such that administrators can configure the types of files (data) to be processed, the buckets (storage) used/accessed, and/or the embeddings model to be used, or the like. For example, a policy may state "FOR OBJECTS of TYPE .jpg DO EMBEDDINGS TYPE image". In this example, processing an object of type .jpg results in a particular type of embeddings. The polices and embeddings-based index may be stored as metadata. This allows the embeddings-based index to be generated in accordance with the policies.

Generating the embeddings-based index offline helps ensure that latency of regular or normal operations (e.g., reads, writes) in the object storage system is not impacted. Generating the embeddings-based index inline may impact the latency of normal operations. In one example, the process or operation of generating an embeddings-based index may be performed on nodes with specific hardware for generating embeddings (e.g., GPUs (graphical processing units)). This embeddings generation operation obtain an object and then check the policies defined in the system metadata that apply to the object, generate embeddings for the object, and store the resulting embeddings in the embeddings-based index.

The embeddings-based index may be a content-based index. More specifically, the embeddings-based index (embeddings index) stores the embeddings resulting from or generated from the content of objects. The embeddings index allows a content similarity search to be performed with respect to the content of the objects rather than just metadata associated with the object. By way of example, the embeddings-based index may be constructed as an extension of an existing index in the object storage system, as a separate vector database, or the like or combinations thereof.

In one example, a family of content-based functionality (e.g., APIs) are provided. For example, in addition to PUT and GET APIs, embodiments may relate to, by way of example only, GET_SIMILAR or DELETE_SIMILAR APIs. These additional APIs allows users to manage objects based on similarity metrics with respect to an object and/or the object's embeddings.

Embodiments of the invention relate to a framework that can be adapted to multiple object storage system configurations. The content-based APIs may facilitate operations that require content-based similarity management, such as searching for medical images.

Embodiments of the invention augment object storage systems with a policy-driven, embeddings-based index layer for data including unstructured data such as multimedia objects. Objects stored in a segment or object storage system may be defined or selected as candidate for embeddings generation via a policy (e.g., "FOR OBJECTS of TYPE .jpg DO EMBEDDINGS TYPE image"). The policies are flexible and allow system administrators to selectively apply embeddings operations. For example, embeddings related operations may be performed on objects based on one or more of specific object type, specific buckets of the object storage system, embeddings model, or the like.

When embeddings are generated offline, objects in an object storage system can be evaluated against the policies and processed without impacting or while minimizing the processes of generating embeddings on the operation of the object storage system. For objects stored in the system that fall into one of the defined policies, an offline process will eventually generate the associated embeddings.

As previously stated, embodiments of the invention may also augment the APIs available in an object storage system. With respect to a GET_SIMILAR or DELETE_SIMILAR API call, a user may provide a file or object as input. The system may be configured to identify/select a model for embedding the input object to determine input data (e.g., embeddings) based on the defined policies. The embeddings can be used to access the embeddings-based index to identify similar objects (similar content). The operations specified by the API call can then be performed.

Embodiments of the invention advantageously provide or relate to polices for offline content-based indexing and/or content-based API calls.

FIG. 1 discloses aspects of a storage system that includes offline policy based embedding-based index generation and content-based functionality. The embeddings storage system (or storage system) 100 includes an object storage system 102 that is integrated or associated with an embedding engine 110. The object storage system 102 includes one or more storage nodes, represented by storage nodes 104, 106, and 108. Each of these storage nodes 104, 106, and 108 may include hardware (processor, memory, storage), is configured to provide some type of storage (e.g., disk storage) or storage service, and may perform object storage operations related to objects stored in the storage.

The storage system 100 also includes or is associated with an embedding engine 110. An embeddings generator 114 is configured to generate embeddings for objects stored in the storage nodes 104, 106, and 108 based on policies 116. The embeddings are stored in an embeddings index 112. Once generated, the embeddings index 112 allows content based operations to be performed, for example via augmented functionality or new APIs.

Figure 2:
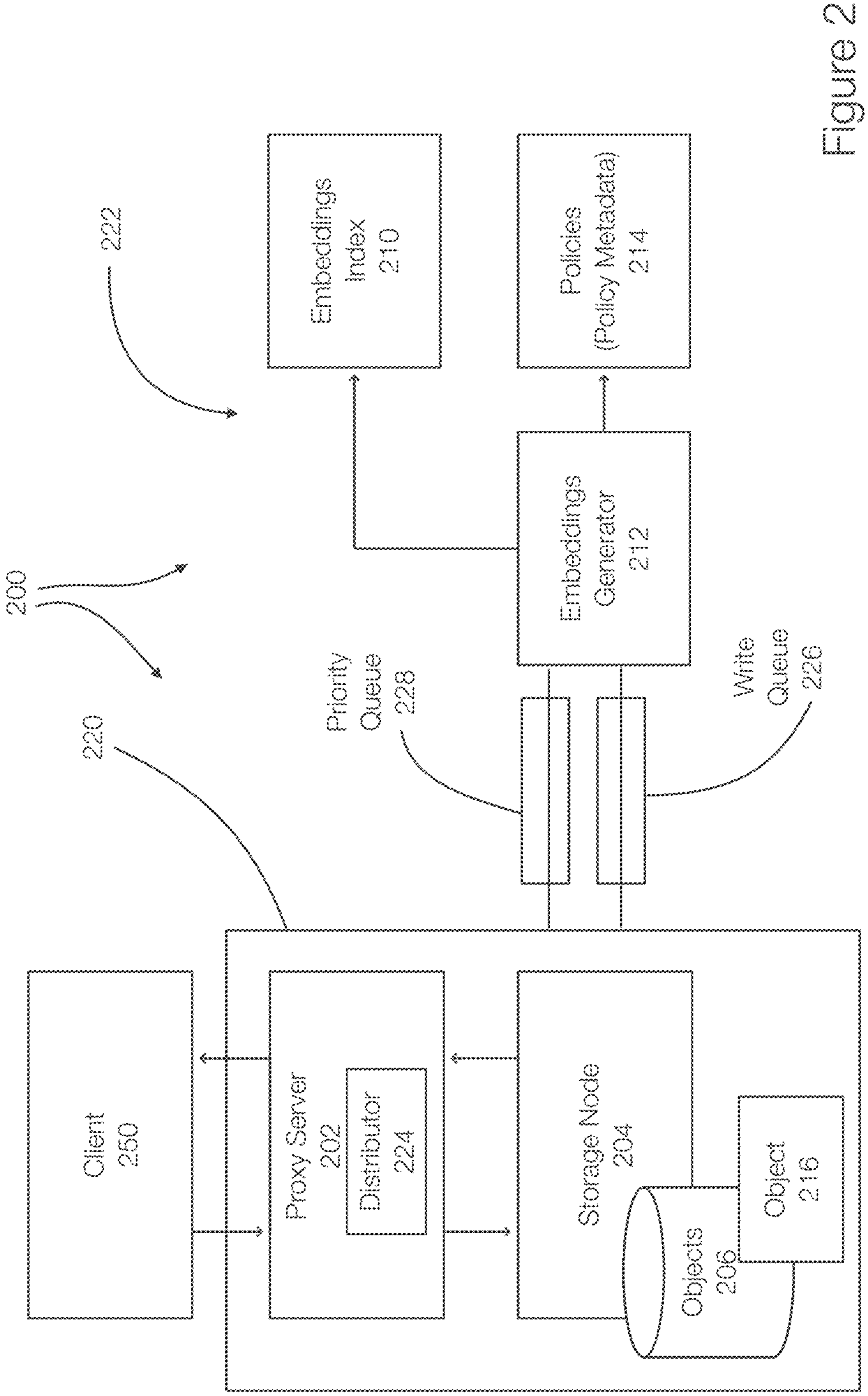
FIG. 2 discloses additional aspects of an embedding storage system.

FIG. 2 discloses additional aspects of a storage system that includes an object storage system and an embedding engine. FIG. 2 illustrates a storage system 200 (an example of the storage system 100) that includes an object storage system 220 (an example of the object storage system 102) and an embedding engine 222 (an example of the embedding engine 110).

In FIG. 2, the object storage system 220 includes a proxy server 202 and one or more storage nodes, represented by the storage node 204. A client 250 (or user) may interact with the object storage system 220 via the proxy server 202 using, for example, APIs. The storage node 204 may store objects 206, such as the object 216, in a storage device.

In one example of the object storage system 220, the proxy server 202 acts as an entry point for requests from the client 250. The requests may be requests for storing, retrieving, and/or managing objects and/or the metadata of the objects. The proxy server 202 performs authentication, authorization, and routing of requests to the appropriate storage nodes in the object storage system 220. The proxy server 202 may also perform load balancing and provides an interface for the client 250. The policy server may also cache policies 214 to facilitate operations related to generating embeddings for objects.

The storage node 204 is configured to store and manage the actual data (the objects). The objects are stored in an immutable manner in one example. Further, the object storage system may distribute replicas across the nodes of the object storage system 220 for redundancy and fault tolerance. The storage node 204 may include local disk storage for the objects 206 and may operate a service responsible for managing object storage operations.

The proxy server 202 may include a distributor 224 (e.g., a hash ring) that is configured to manage the placement and retrieval of objects across the storage nodes. In one example, the distributor 224 may maintain a mapping between object names (keys) and the physical locations of the objects, including locations of replicas.

In addition to storing the object itself, the object storage system 220 may also store metadata such as timestamps, object (file) type, size, and the like. The metadata is typically stored with the object and may be used for indexing and searching objects stored in the object storage system 220. The metadata may also be replicated for redundancy and resilience in the object storage system 220.

Content-based searching relates to retrieving information based on the characteristics or features of the content itself, rather than relying solely on metadata or keywords associated with the content. This approach is particularly useful when dealing with large datasets where manual tagging or labeling may be impractical or insufficient. Content-based search systems analyze the intrinsic properties of the data, such as its textual content, visual appearance, or audio signatures, to index and retrieve relevant information.

Embeddings, by way of example, are mathematical representations of data that capture its semantic or contextual relationships in a lower-dimensional space. Embeddings encode meaningful features of the data in a vector space, where similar items are mapped close together, and dissimilar items are mapped far apart. In the context of content-based similarity searches, embeddings play a role in representing the content in a format that is conducive to efficient similarity computation and retrieval.

For text data, techniques like word embeddings (e.g., Word2Vec, GloVe) and sentence embeddings (e.g., Universal Sentence Encoder) are commonly used to convert words or sentences into high-dimensional vectors that capture semantic relationships between them. Similarly, for multimedia objects such as images and audio, deep learning models such as convolutional neural networks (CNNs) and recurrent neural networks (RNNs) can be employed to generate embeddings that encode visual or auditory features of the object's content.

Once the embeddings of an object are generated, content-based search systems can perform similarity calculations using distance metrics such as cosine similarity or Euclidean distance to retrieve items that are most similar to a given query or input. These systems enable various applications, including recommendation systems, search engines, content tagging, and similarity-based clustering, across a wide range of domains.

FIG. 2 illustrates an embeddings engine 222. In one example, the embedding generator 212 may receive or retrieve an object 216. This typically occurs after the object 216 has been committed to the objects 206. Embeddings for the object 216 are generated in accordance with policies 214 and stored in the embeddings index 210.

FIG. 2 further illustrates offline and online aspects of performing embeddings related operations. When the client 250 is writing or putting an object to the object storage system 220, an event is generated and placed in the write queue 226. The embeddings engine 222 may subscribed to the write queue 226. Events in the write queue 226 are processed eventually and offline. The ensures that generating embeddings for the objects 206 in the storage node 204 do not impact the normal operations of the object storage system.

The embedding engine 222 may also subscribe to a priority queue 228. The priority queue 228 receives events that may be associated with reads, searches, or other queries that may use the embeddings index 210. In this case, the priority queue 228 has higher priority than the write queue 226 and is typically processed inline at least because a response is expected to the request. Thus, the embeddings generator 212 access the object from the priority queue 228, generates embeddings, and performs an action (e.g., a search) in the embeddings index based on the embeddings of the object retrieved from the priority queue 228 and associated with an input query. This allows the response to be generated and returned.

Figure 3:
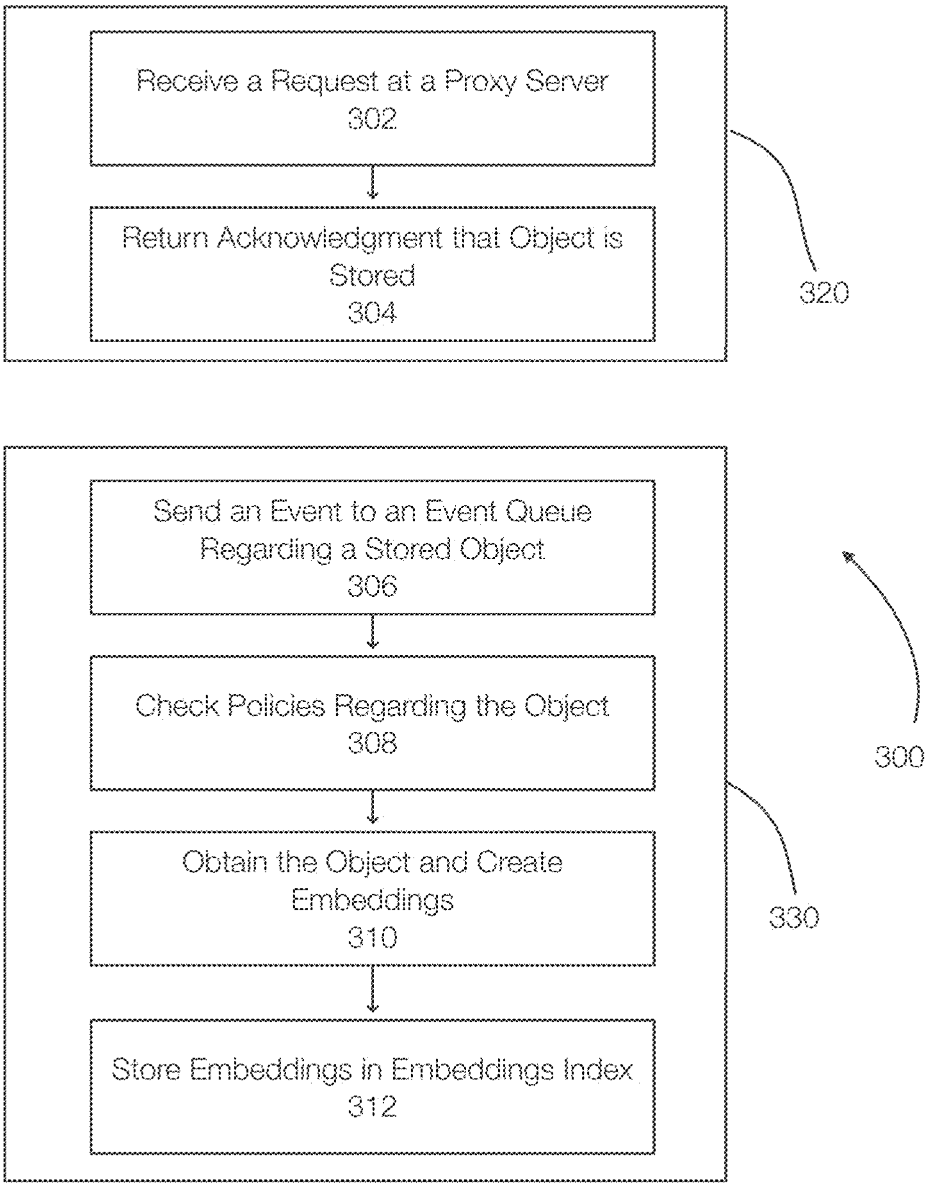
FIG. 3 discloses aspects of generating embeddings from the perspective of a write operation in the embeddings storage system.

FIG. 3 discloses aspects of generating embeddings for objects stored in an object storage system from a write perspective. The method 300 includes a method 320 and a method 330. The method 320 represents normal operation of the object storage system. The method 320 may include writing an object to storage. Thus, a request 302 is received (e.g., from a client) at a proxy server of the object storage system and the object associated with or included in the request is committed to the storage. After the object has been committed or written to the storage, an acknowledgement 304 is returned to the client indicating that the object was successfully stored/written.

The method 330 discloses aspects of generating embeddings for the object written to the object storage system by the method 320. While these methods 320 and 330 operate concurrently, the method 320 is not dependent on or delayed by the method 330. Thus, the method 330 may be performed offline, when resources are available, or the like.

When the request 302 is received (or at another time), an event may be generated and placed 306 in a write queue (or other event queue). The events or entries in the write queue represent objects that have been stored to the object storage system. The write queue is persistent such that events are not missed in case of failures or outages.

The embedding engine may subscribe to the write queue. With regard to the events in the write queue, the embedding engine may be configured to distribute the load represented by the events to available processes of the embedding engine. When the embedding engine receives an event from the write queue, the policies associated with the embedding engine 308 are evaluated in the context of the object. It is possible that the object may not be subject to the embeddings operation and the event may be discarded.

If the policies (or a particular policy) apply to the object associated with the event, the object is retrieved from the appropriate storage node and an embedding operation is performed 310 in accordance with the policy. In one example, embeddings operations are performed when the object satisfies the constraints or requirements of at least one policy. For example, a policy may be to embed objects of type ".jpg" using a particular embedding model. The policies may identify various features or actions such as file type, bucket, embedding model, or the like or combinations thereof. The policies can changed (added, deleted, updated).

Once the embeddings are created, the embeddings are stored 312 in an embeddings index. This allows similarity queries (e.g., content-based similarity searches) to be performed based on the embeddings of the objects represented in the embeddings index.

Using a write queue that is persistent ensures the embeddings are generated eventually for the objects stored in the object storage system even if not generated immediately or inline. More specifically, there is a trade-off between generating embeddings inline (embeddings generation infrastructure cost, request latency) and generating embeddings offline. As data replication itself is eventually consistent in many object stores, this approach for generating embeddings from object contents follows a similar pattern. In other words, just as objects are replicated eventually, embeddings are similarly generated eventually.

Figure 4:
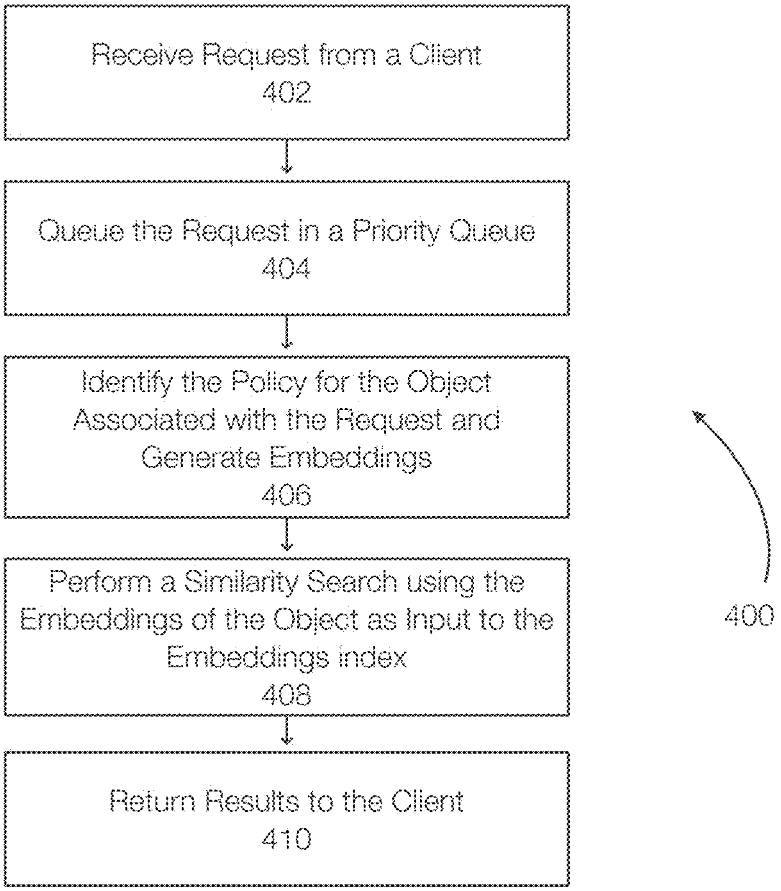
FIG. 4 discloses aspects of generating embeddings and performing embeddings related operations from the perspective of a request operation in the embeddings storage system.

FIG. 4 discloses aspects embeddings related operations, such as content-based similarity searches, a user request perspective (e.g., a read perspective). The term read conveys that data is being read and may encompass other operations such as a search of a storage. In one example, aspects of the read operation are performed inline at least because the input or query is processed to generate embeddings that are used to conduct a search in the embeddings index before returning the response to the request.

With the method 400, additional calls (e.g., API calls) may be made available that extend the APIs of a conventional object storage system. In the method 400, the proxy server may receive 402 a request (e.g., an API call, such as a GET_SIMILAR call). The request may be accompanied with or include an object. For example, the request may include an image, a video, an audio, text, or the like. The proxy server receives 402 the request and queues 404 the request in a priority queue for embeddings generation.

Events or elements in the priority queue typically require immediate processing. Thus, events in the priority queue have priority over the events in the write queue. In contrast to the write scenario of FIG. 3, the read scenario performs an embeddings generation operation using the client (or user) provided object directly from the priority queue (e.g., the object may not be stored in the object storage system yet and may not ever be stored in the object storage system).

The method 400 may identify 406 a policy (or multiple policies) that are relevant to the object included in the request and generate the embeddings in accordance with the identified policy. Once the embeddings for the object have been generated, a similarity search is performed 408 to obtain similar objects (GET_SIMILAR) using the embeddings.

More specifically, the proxy server may perform a similarity search query to the embeddings-based index using the embeddings to find objects similar to the user or client-provided object. In one example, the criteria for what constitutes similar or similarity may vary and may be defined in the request. The similarity may be based on Euclidean distance, cosine similarity, or the like. The result of the search is returned 410 to the client (or user). In some examples, and depending on the nature of the original request, the response may include the objects and/or identify the similar objects.

The flow of a particular request may vary. For a GET_SIMILAR request, the response may include a list of similar objects (e.g., ranked according to a similarity metric) and/or the objects. For a DELETE_SIMILAR request, the user may be given an opportunity to review the similar objects that are identified for deletion. The user may be able specify which objects are to be deleted. Of course, the operation may proceed without additional user input. In some examples, a limit may be placed. For example, a DELETE_SIMILAR call may only allow n objects to be deleted per request.

Advantageously, embodiments of the invention provide flexibility in configuring the embeddings generation process or in configuring the models configured to generate embeddings. This improves both administration of the embeddings engine and usability of the embeddings engine. For example, there may be a need for specialized embedding engines that are tailored to specific use-cases. In health-related use-cases, for example, a first embedding model may be generated/configured for heart images and a second embedding model may be generated/configured for liver images. The embedding model used for a read scenario (e.g., FIG. 4) may be based on policy. Similarly, the embedding model for a write scenario (e.g., FIG. 3) may also be based on policy.

Figure 5:
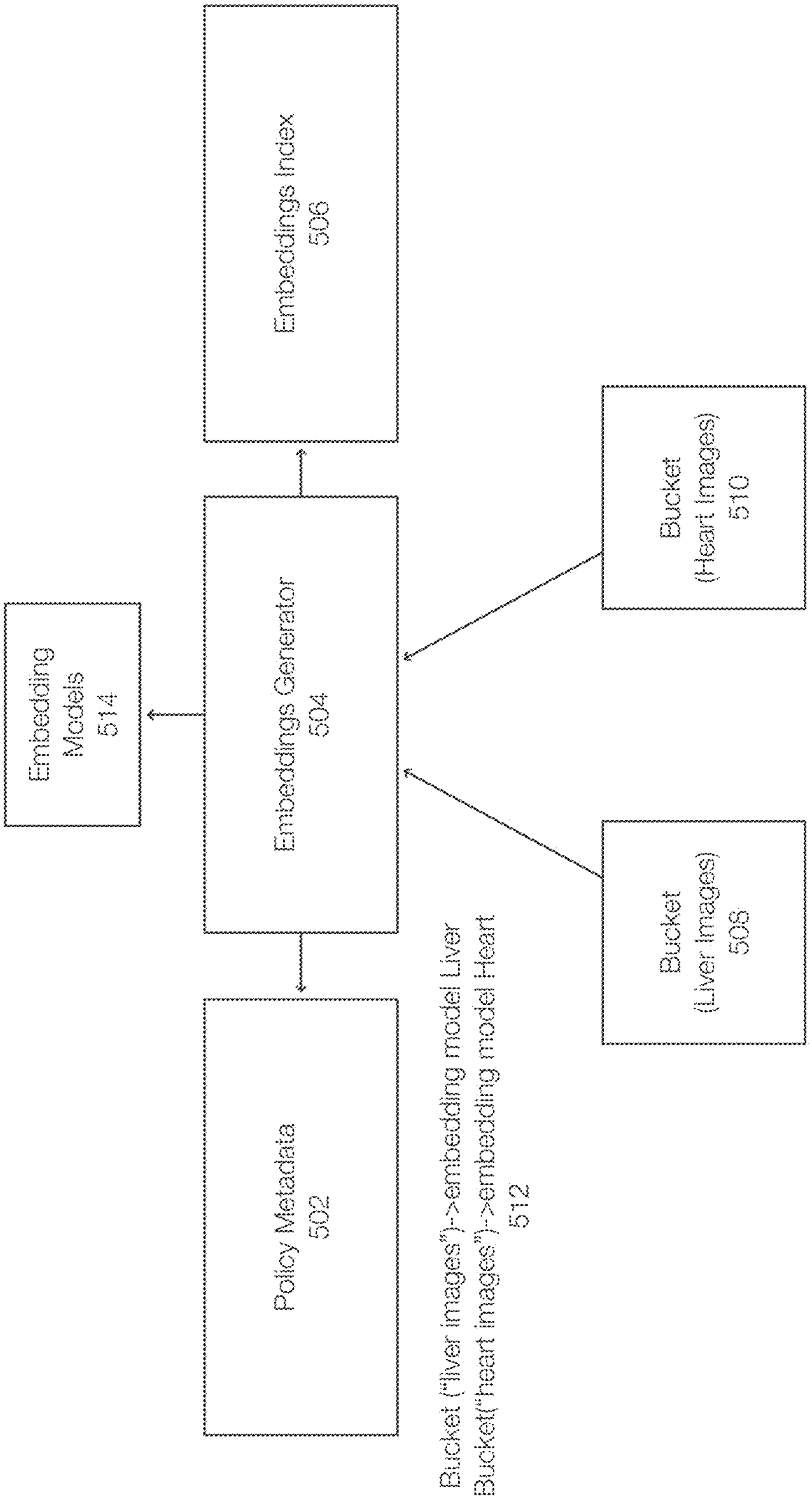
FIG. 5 discloses aspects of policies that guide embeddings related operations in the embeddings storage system.

FIG. 5 discloses additional aspects of generating embeddings. FIG. 5 is illustrated from the perspective of a write scenario where the embeddings engine is processing the events in the write queue. In one example, the write queue may include an event associated with a liver image that was written to the bucket 508 of liver images during a PUT request.

When the event of writing the liver image is retrieved from the write queue, the liver image is retrieved from the bucket 308 of liver images and the policy metadata 502 is consulted. The policy metadata 512, which is an example of the policy metadata 502, defines that images retrieved from the bucket 508 (the liver images bucket) should be embedded using the embeddings model liver. The embeddings models 514, which includes the liver model and the heart model, is accessed and the liver model is used to generate embeddings for the liver image. The embeddings are then stored in the embeddings index 506. An image retrieved from the bucket 510 of heart images is encoded using an embeddings model heart, as specified in the polices 512. Thus, images added to the bucket 508 or the bucket 510 are processed using a specific model in this example that is guided by policy. This allows objects to be embedded or otherwise processed in a policy-based manner.

The policies can be updated as previously stated. The policy metadata 502 may include conditional statements or other representations or configurations. For example, the policy metadata may specify various conditions or requirements. For example, an image may have a variety of formats. Thus, the policies may include a policy stating that liver images from bucket 508 of file type ".jpg" are embedded using liver model 1 while liver images from bucket 508 of file type ".png" are embedded using liver model 2. Alternatively, different types of images may be stored in different buckets and the policies can be configured to reflect this different storage configuration. The policies are flexible and configurable and can adapt to different storage configurations, changes in storage configurations, different storage systems, and the like.

In one example, the embeddings generation process is extensible and allows a variety of embeddings models to be executed. For example, embeddings generation containers may be established per object storage user/account. This would allow users to provide containers that implement their embeddings models using standard APIs. These models may be executed in a sandbox on the objects related to the user/account. Users could add more containers with additional embeddings models and provide multiple policies to guide the operations related to generating embeddings for objects.

This may also allow the local resources of the storage nodes to be used to run the models in a scenario where the storage infrastructure (e.g., active storage) is able to execute compute-intensive processes. In another example, serverless execution frameworks (also encapsulating the model functionality in containers) may be used to decouple the storage infrastructure from the computing infrastructure. Embodiments of the invention are not limited to these implementations and allow different embedding models based, in one example, on administrator defined policies.

In another example as previously mentioned, embodiments of the invention provide additional functionality (e.g., new APIs) that allow objects to be managed based on their content. These include, by way of example and not limitation, GET-SIMILAR, DELETE-SIMILAR, and UPDATE-SIMILAR. These calls may handle objects as input to internally generate the embeddings for the object and perform the similarity search in the context of the overall functionality. Alternatively, a user may provide embeddings directly to perform a content similarity search. Further, these calls may offer optional parameters to customize the content-based similarity search. For instance, the calls may specific the type of similarity metric to be used, number of results to return, or the like or combinations thereof.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, inline and/or offline embedding operations (e.g., using machine learning models), embeddings index related operations, content-based search operations, or the like or combinations thereof. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter, an edge system, an on-premise system, or the like, which is operable to perform operations initiated by one or more clients or other elements of the operating environment.

Example cloud computing environments, which may or may not be public, include storage environments that may provide functionality for one or more clients. Another example of a cloud computing environment is one in which processing, data storage, data protection, and other services may be performed on behalf of one or more clients. Some example cloud computing environments in which embodiments may be employed include Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients capable of collecting, modifying, and creating, data. As such, a particular client or server or other computing system may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' or 'object' is intended to be broad in scope. Example embodiments are applicable to any system capable of storing and handling various types of objects, in analog, digital, or other form. Multimedia objects and other unstructured data may be examples of objects.

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method comprising: sending an event to a write queue associated with an embedding engine configured to perform embeddings operations, wherein the event includes writing an object to a storage of the storage system, processing the event in the write queue by evaluating policies available to the embedding engine to identify a policy applicable to the object, retrieving the object and generating embeddings of the object in accordance with the policy, wherein the embeddings represent content of the object, and storing the embeddings in an embeddings index, wherein the embeddings index is configured to facilitate content similarity searches Embodiment 2. The method of embodiment 1, wherein the storage system comprises an object storage system.

Embodiment 3. The method of embodiment 1 and/or 2, wherein events in the write queue are processed offline by the embeddings engine.

Embodiment 4. The method of embodiment 1, 2, and/or 3, wherein the policies identify actions related to embeddings operations performed on objects that are subject to the policies or wherein the policies dictate which objects, buckets, and/or accounts targeted for embeddings operations.

Embodiment 5. The method of embodiment 1, 2, 3, and/or 4, further comprising caching the policies at a server of the storage system.

Embodiment 6. The method of embodiment 1, 2, 3, 4, and/or 5, wherein the embeddings index comprises a vector database.

Embodiment 7. The method of embodiment 1, 2, 3, 4, 5, and/or 6, further comprising performing normal operations in the storage system such that the events in the write queue are processed offline.

Embodiment 8. The method of embodiment 1, 2, 3, 4, 5, 6, and/or 7, further comprising: receiving a request from a client, wherein the request includes an input object, generating input embeddings for the input object according to a policy applicable to the input object, performing a content similarity search in the embeddings index based on the input embeddings, and performing an action based on the request on results of the content similarity search.

Embodiment 9. The method of embodiment 1, 2, 3, 4, 5, 6, 7, and/or 8, further comprising placing the request from the client in a priority queue that has a higher priority than the write queue, wherein the priority queue is processed inline.

Embodiment 10. The method of embodiment 1, 2, 3, 4, 5, 6, 7, 8, and/or 9, wherein the request is one of a call to get similar objects, delete similar objects or update similar objects identified in the results.

Embodiment 11. The method of embodiment 1, 2, 3, 4, 5, 6, 7, 8, 9, and/or 10, wherein the policies specify a first embeddings model for objects from a particular bucket in the storage system and/or a second embeddings model for objects of a particular type.

Embodiment 12. The method of embodiment 1, 2, 3, 4, 5, 6, 7, 8, 9, 10, and/or 11, wherein the write queue is persistent and survives failures.

Embodiment 13. A system, comprising hardware and/or software, operable to perform any of the operations, methods, or processes, or any portion of any of these, disclosed herein.

Embodiment 14. A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 6:
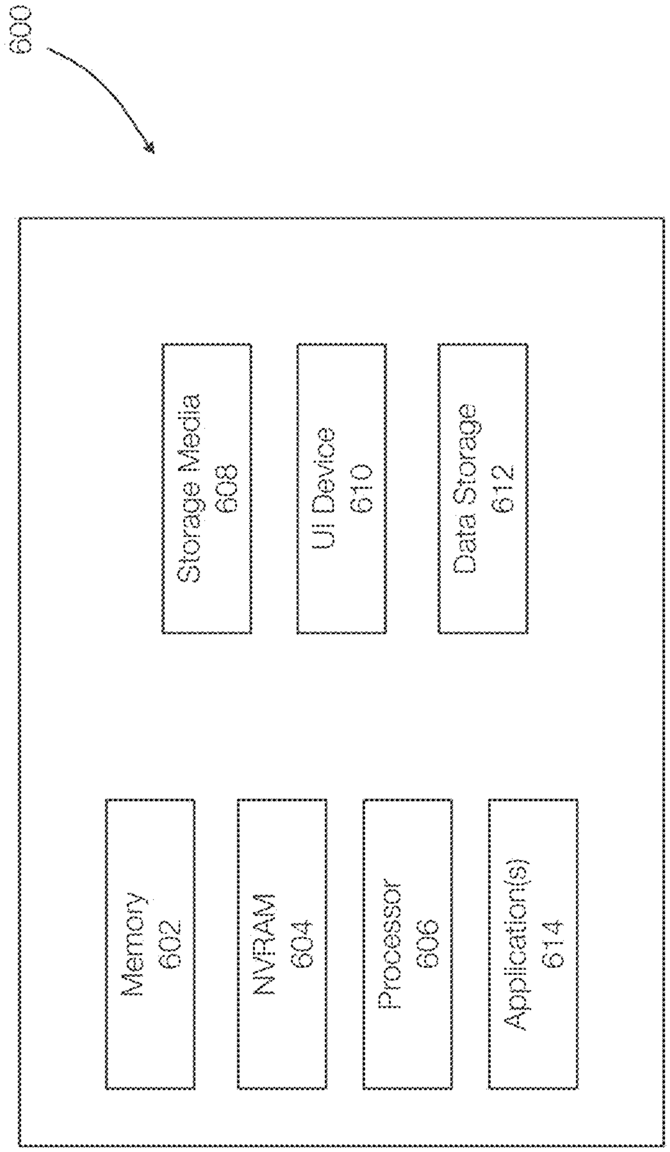
FIG. 6 discloses aspects of a computing device, a computing system, or computing entity.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

The device 600 may also represent a computing system such as a server or set of servers, an edge based computing system, a cloud-based computing system, or the like. The computing system may be localized or distributed in nature.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 600 may also represent a physical or virtual machine or server, an edge-based computing system, a cloud-based computing system, server clusters or other computing systems or environments. The device 600 may also represent multiple machines or devices, whether virtual, containerized, or physical. The device 600 may perform or execute steps or acts of the methods/operations illustrated in the Figures and described herein.

The device 600 may represent a cloud-based system, an edge-based, system, an on-premise system, or combinations thereof. Document understanding and related operations may be performed using these types of computing environments/systems.

The described embodiments are to be considered in all respects only as illustrative and not restrictive. All changes which come within the meaning and range of equivalency of the claims are to be embraced within their scope.

What is claimed is:

1. In a system that includes a storage system that is associated with an embeddings engine, a method comprising:

sending an event to a write queue associated with an embedding engine configured to perform embeddings operations, wherein the event includes writing an object to a storage of the storage system, wherein the event corresponds to an object stored in the storage system;

processing the event in the write queue by evaluating policies available to the embedding engine to identify a policy applicable to the object, wherein events in the write queue are processed eventually and offline by the embeddings engine, wherein the policies specify a first embeddings model for objects stored in a first bucket of the storage system and a second embeddings model for objects stored in a second bucket of the storage system;

retrieving the object from a storage node of the storage system and generating embeddings of the object in accordance with the policy, wherein the embeddings represent content of the object and wherein generating the embeddings does not impact read or write operations of the storage system; and storing the embeddings in an embeddings index, wherein the embeddings index is configured to facilitate content similarity searches, and wherein the embeddings index stores embeddings generated from content of objects stored in the storage system.

2. The method of claim 1, wherein the storage system comprises an object storage system.

3. The method of claim 1, wherein the policies identify actions related to embeddings operations performed on objects that are subject to the policies or wherein the policies dictate which objects, buckets, and/or accounts targeted for embeddings operations.

4. The method of claim 1, further comprising caching the policies at a server of the storage system.

5. The method of claim 1, wherein the embeddings index comprises a vector database.

6. The method of claim 1, further comprising:

receiving a request from a client, wherein the request includes an input object;

generating input embeddings for the input object according to a policy applicable to the input object;

performing a content similarity search in the embeddings index based on the input embeddings; and performing an action based on the request on results of the content similarity search.

7. The method of claim 6, further comprising placing the request from the client in a priority queue that has a higher priority than the write queue, wherein the priority queue is processed inline.

8. The method of claim 6, wherein the request is one of a call to get similar objects, delete similar objects or update similar objects identified in the results.

9. The method of claim 1, wherein the policies specify a first embeddings model for objects from a particular bucket in the storage system and/or a second embeddings model for objects of a particular type.

10. The method of claim 1, wherein the write queue is persistent and survives failures.

11. A non-transitory storage medium having stored therein instructions that are executable by one or more hardware processors to perform operations in a system that includes a storage system associated with an embeddings engine, the operations comprising:

sending an event to a write queue associated with an embedding engine configured to perform embeddings operations, wherein the event includes writing an object to a storage of the storage system, wherein the event corresponds to an object stored in the storage system;

processing the event by evaluating policies associated with the embedding engine to identify a policy applicable to the object, wherein events in the write queue are processed eventually and offline by the embeddings engine, wherein the policies specify a first embeddings model for objects stored in a first bucket of the storage system and a second embeddings model for objects stored in a second bucket of the storage system;

retrieving the object from a storage node of the storage system and generating embeddings of the object in accordance with the policy, wherein the embeddings represent content of the object and wherein generating the embeddings does not impact normal read or write operations of the storage system; and storing the embeddings in an embeddings index, wherein the embeddings index is configured to facilitate content similarity searches, and wherein the embeddings index stores embeddings generated from content of objects stored in the storage system.

12. The non-transitory storage medium of claim 11, wherein the storage system comprises an object storage system.

13. The non-transitory storage medium of claim 11, wherein the policies identify actions related to embeddings operations performed on objects that are subject to the policies or wherein the policies dictate which objects, buckets, and/or accounts are targeted for embeddings operations, and/or wherein the policies specify a first embeddings model for objects from a particular bucket in the storage system and/or a second embeddings model for objects of a particular type.

14. The non-transitory storage medium of claim 11, further comprising caching the policies.

15. The non-transitory storage medium of claim 11, wherein the embeddings index comprises a vector database.

16. The non-transitory storage medium of claim 11, further comprising:

receiving a request from a client, wherein the request includes an input object;

generating input embeddings for the input object according to a policy applicable to the input object;

performing a content similarity search in the embeddings index based on the input embeddings; and performing an action based on the request on results of the content similarity search.

17. The non-transitory storage medium of claim 16, further comprising placing the request from the client in a priority queue that has a higher priority than the write queue, wherein the priority queue is processed inline, wherein the write queue and the priority queue are persistent, wherein the request is one of a call to get similar objects, delete similar objects or update similar objects identified in the results.

* * * * *